United States Patent
Hooper et al.

(10) Patent No.: US 7,684,970 B2
(45) Date of Patent: Mar. 23, 2010

(54) GRAPHICAL USER INTERFACE FOR USE DURING PROCESSOR SIMULATION

(75) Inventors: Donald F. Hooper, Shrewsbury, MA (US); Eric Walker, Lancaster, MA (US); Dennis Rivard, Salem, NH (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 965 days.

(21) Appl. No.: 10/877,922

(22) Filed: Jun. 25, 2004

(65) Prior Publication Data

US 2005/0288917 A1    Dec. 29, 2005

(51) Int. Cl.
G06F 9/44 (2006.01)
G06F 3/00 (2006.01)
(52) U.S. Cl. .................................. 703/21; 715/700
(58) Field of Classification Search ............... 703/21; 715/700
See application file for complete search history.

(56) References Cited

U.S. PATENT DOCUMENTS

| | | | | |
|---|---|---|---|---|
| 5,604,889 | A * | 2/1997 | Pickens et al. | 703/15 |
| 5,818,838 | A * | 10/1998 | Backes et al. | 370/390 |
| 5,819,071 | A * | 10/1998 | Mazer | 703/27 |
| 6,611,276 | B1 * | 8/2003 | Muratori et al. | 715/772 |
| 7,133,820 | B2 * | 11/2006 | Pennello et al. | 703/22 |
| 2002/0062208 | A1 * | 5/2002 | Gomez et al. | 703/21 |
| 2003/0036896 | A1 * | 2/2003 | Skingsley et al. | 703/21 |

OTHER PUBLICATIONS

"A Taxonomy of Multiple Window Coordinations", North, C. and Shneiderman, B, University of Maryland, 1997.*
Re-submitted version of Figure 2, PGPub 2002/0062208.*

* cited by examiner

Primary Examiner—Paul L Rodriguez
Assistant Examiner—Nithya Janakiraman
(74) Attorney, Agent, or Firm—Grossman, Tucker, Perreault & Pfleger, PLLC (57) ABSTRACT

In accordance with one exemplary embodiment, the present disclosure includes a method for executing application software during a simulation that models a processor for which the application software was developed. The method may include capturing results of the simulation to produce a simulation history. The method may also include providing a graphical user interface (GUI) that includes one or more cross-linked packet-centric views of the simulation history for packets operated on by the application software during the simulation. The cross-linked packet-centric views may include a packet status list GUI, a packet event list GUI, a packet dataflow GUI, a thread list GUI, and a thread history GUI. Of course, many alternatives, variations and modifications are possible without departing from this embodiment.

10 Claims, 12 Drawing Sheets

| PC | SRC1 | SRC2 | DEST | I/O XFER | XFER COUNT | I/O DIRECTION |
|---|---|---|---|---|---|---|
|  |  |  |  |  |  |  |
|  |  |  |  |  |  |  |
|  |  |  |  |  |  |  |
| ... |  |  |  |  |  |  |

FIG. 7

| TIME/CYCLE | THREAD STATE | THREAD NUMBER | PC | PACKET FILTER FLAG |
|---|---|---|---|---|
| 0 | EXECUTING | 0 | 0 |  |
| 1 | EXECUTING | 0 | 1 |  |
| 2 | ABORTED | 0 | 2 |  |
| 3 | EXECUTING | 1 | 0 |  |
| 4 | EXECUTING | 1 | 1 |  |
| 5 | ABORTED | 1 | 2 |  |
| ... |  |  |  |  |

GRAPHICAL USER INTERFACE FOR USE DURING PROCESSOR SIMULATION

BACKGROUND

With each new generation of network processors, hardware architecture becomes more complex, e.g., with the addition of processing elements, memory controllers, hardware acceleration co-processors, and other features. Thus, the need to simplify the code debugging processes is greater than ever before. Debugger tools to date provide a visual simulation environment with views of multiple processing elements and multiple hardware execution threads.

DESCRIPTION OF DRAWINGS

Like reference numerals will be used to represent like elements.

DETAILED DESCRIPTION

Figure 1:
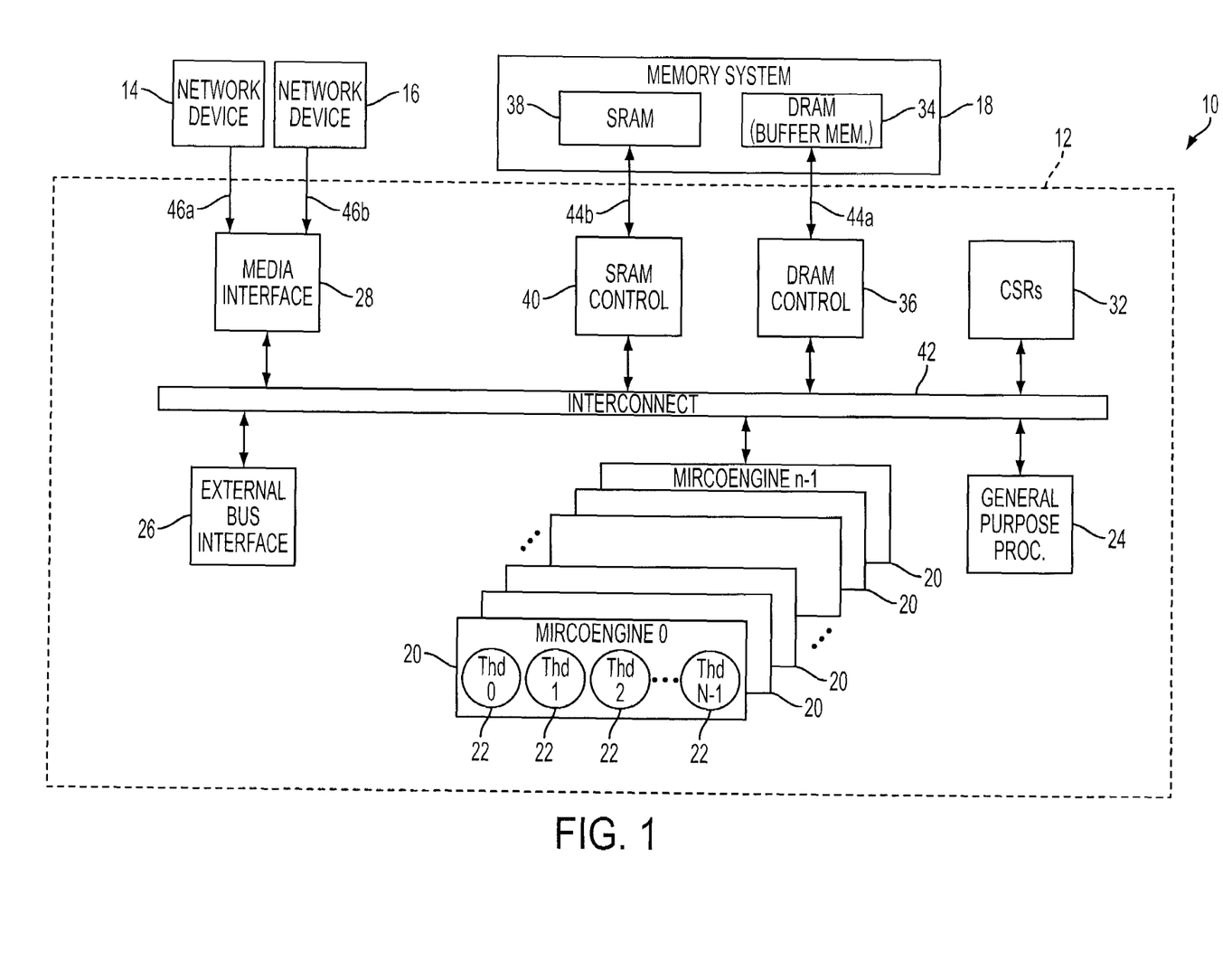
FIG. 1 is a block diagram of a system having a processor with microengines that support multiple threads of execution.

Referring to FIG. 1, a system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines. In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface 26, a media interface 28 and Control and Status Registers (CSRs) 32. The media interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14, 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, such as a network forwarding device line card, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The media interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The media interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive packets from a network device like network device 14 and process those packets in a parallel manner. The term "packet" as used herein may refer to an entire network packet (e.g., Ethernet packet) or, a portion of such a network packet, e.g., a cell such as a Common Switch Interface (or "CSIX") cell or ATM cell, as well as other units of information.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
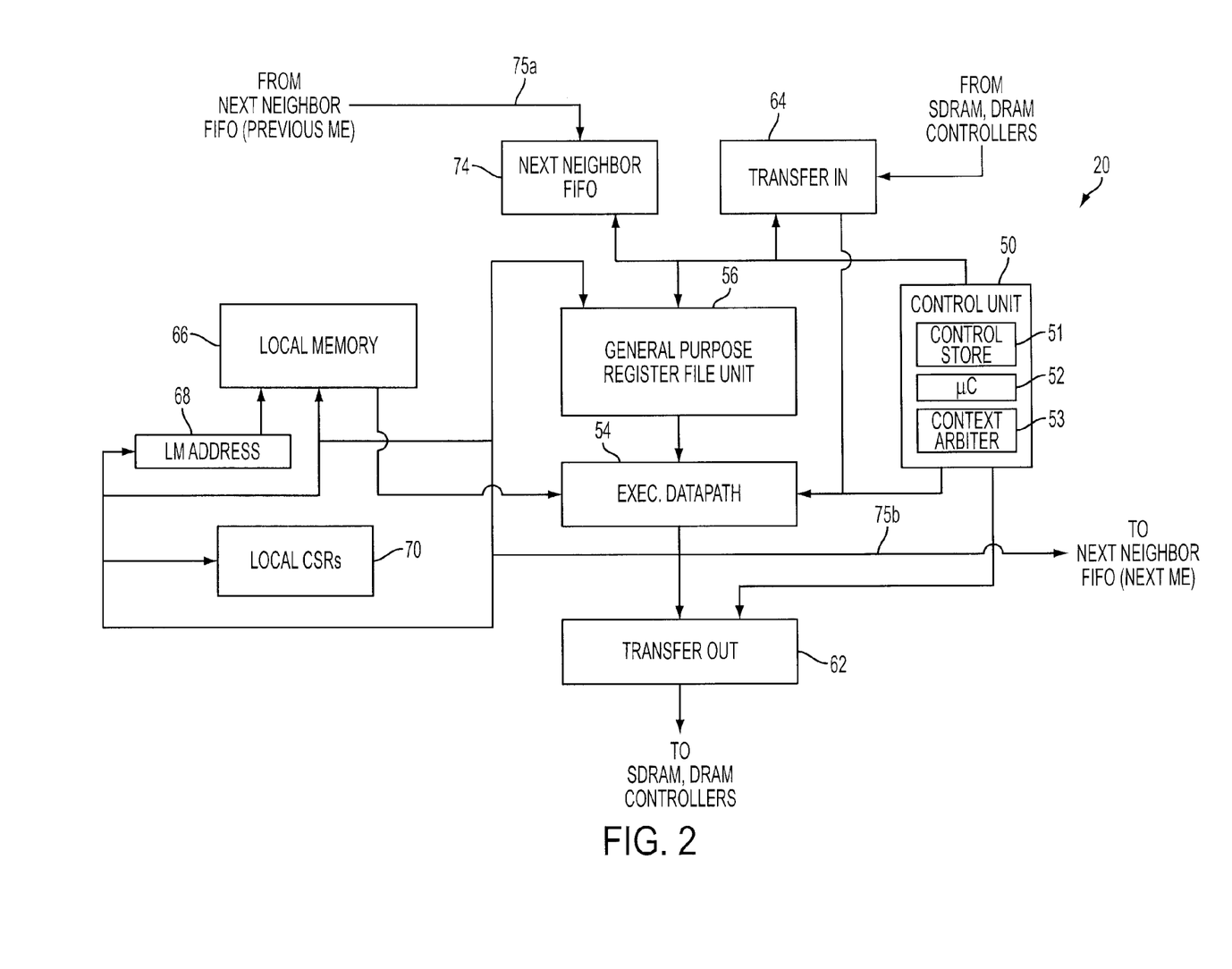
FIG. 2 is a block diagram that shows an exemplary architecture of the microengine (ME).

Referring to FIG. 2, an exemplary microengine (ME) 20 is shown. The ME 20 includes a control unit 50 that includes a control store 51, control logic (or microcontroller) 52 and a context arbiter/event logic 53. The control store 51 is used to store microcode. The microcode is loadable by the processor 24. The functionality of the ME threads 22 is therefore determined by the microcode loaded via the processor 24 for a particular user's application into the microengine's control store 51.

The microcontroller 52 includes an instruction decoder and program count (PC) units for each of the supported threads. The context arbiter/event logic 53 can receive messages from any of the shared resources, e.g., SRAM 38, DRAM 34, or processor core 24, and so forth. These messages provide information on whether a requested function has been completed. The ME 20 also includes an execution datapath 54 and a general purpose register (GPR) file unit 56 that is coupled to the control unit 50. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The ME 20 further includes write transfer (transfer out) register file 62 and a read transfer (transfer in) register file 64. The write transfer registers of the write transfer register file 62 store data to be written to a resource external to the microengine. In the illustrated embodiment, the write transfer register file is partitioned into separate register files for SRAM and DRAM. The read transfer register file 64 is used for storing return data from a resource external to the microengine 20. Like the write transfer register file, the read transfer register file is divided into separate register files for SRAM and DRAM. The transfer register files 62, 64 are connected to the datapath 54, as well as the control store 50. The architecture of the processor 12 supports "reflector" instructions that allow any ME to access the transfer registers of any other ME.

Also included in the ME 20 is a local memory 66. The local memory 66, addressed by registers 68, supplies operands to the datapath 54 and receives results from the datapath 54 as a destination.

The ME 20 also includes local control and status registers (CSRs) 70, coupled to the transfer registers, for storing local inter-thread and global event signaling information, as well as other control and status information. Other storage and functional units may be included in the ME 20 as well.

Other register types of the ME 20 include next neighbor (NN) registers 74, coupled to the control store 50 and the execution datapath 54, for storing information received from a previous neighbor ME ("upstream ME") in pipeline processing over a next neighbor input signal 76a, or from the same ME, as controlled by information in the local CSRs 70. A next neighbor output signal 76b to a next neighbor ME ("downstream ME") in a processing pipeline can be provided under the control of the local CSRs 70. Thus, a thread on any ME can signal a thread on the next ME via the next neighbor signaling.

Figure 3A:
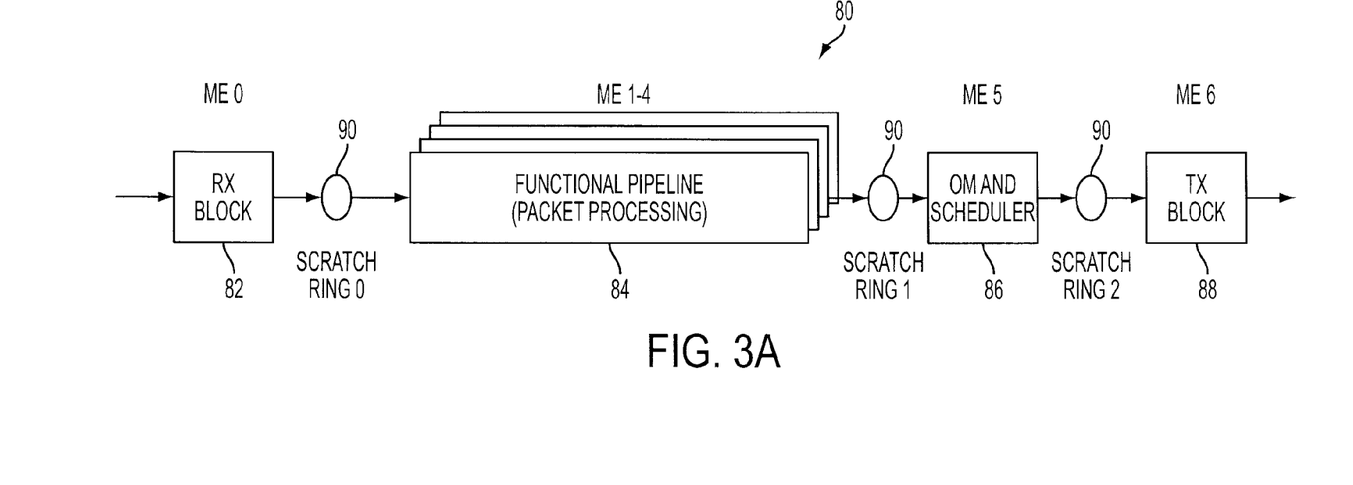
FIGS. 3A-3B show an exemplary ME task assignment for a software pipeline model of the processor (from FIGS. 1-2) programmed to run a particular network application.

The functionality of the microengine threads 22 is determined by microcode loaded (via the general purpose processor or "GPP" 24) for a particular user's application into each microengine's control store 51. Referring to FIG. 3A, an exemplary ME task assignment for a software pipeline model 80 of the processor 12 programmed to run a particular network application is shown. The task assignment may be represented in terms of "microblocks". A microblock is a block of ME microcode that reflects a high-level partitioning in the application. In the illustrated ME task assignment, the processor 12 supports the following: a receive ("Rx") microblock 82 which executes on single microengine (ME 0); a functional pipeline 84 of multiple microblocks (that perform packet processing, e.g., such operations as packet classification, packet forwarding, differentiated services or "Diffserv" processing), which runs on four MEs (shown as MEs 1 through 4); a queue manager and scheduler microblock 86 which executes on a sixth ME (ME 5); and a transmit ("Tx") microblock 88 which executes on a seventh ME (ME 6). The single microblock ME stages (e.g., microblocks 82, 88) are referred to as context pipestages. Scratch rings 90 are used to pass information between context pipestages, and to pass information between context pipestages and functional pipelines.

Figure 3B:
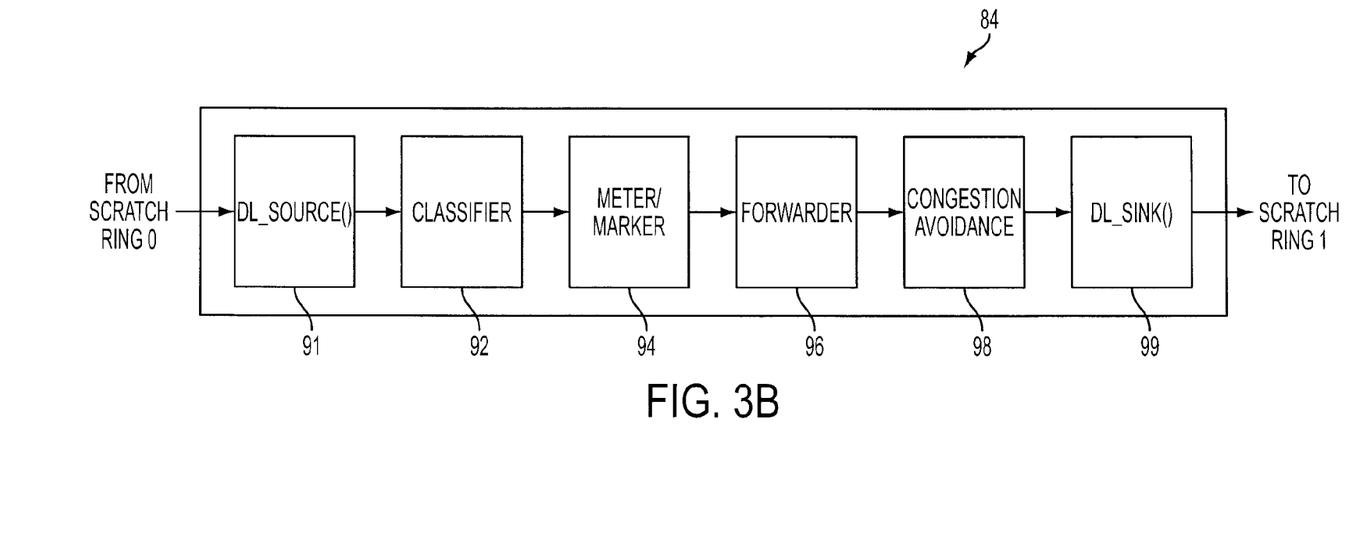

In one embodiment, as shown in FIG. 3B, the functional pipeline 84 involves the execution of the following microblocks: a source ("dl_source[ ]") microblock 91, a classifier microblock 92, a meter microblock 94, a forwarder microblock 96; a congestion avoidance (CA) microblock 98; and a sink ("dl_sink[ ]") microblock 99. In the illustrated example, the source microblock 91 reads data unit from the scratch ring 0. At the end of CA microblock processing, the block dl_sink[ ] microblock 99 enqueues information based on the results of the functional pipeline processing to the downstream scratch ring 1.

Collectively, the stages 91, 92, 94, 96, 98 and 99 form a functional pipeline, as noted earlier. The functional pipeline runs on four MEs in parallel, and each of the eight threads (threads 0 through 7) in each ME is assigned a different packet for processing.

Figure 4:
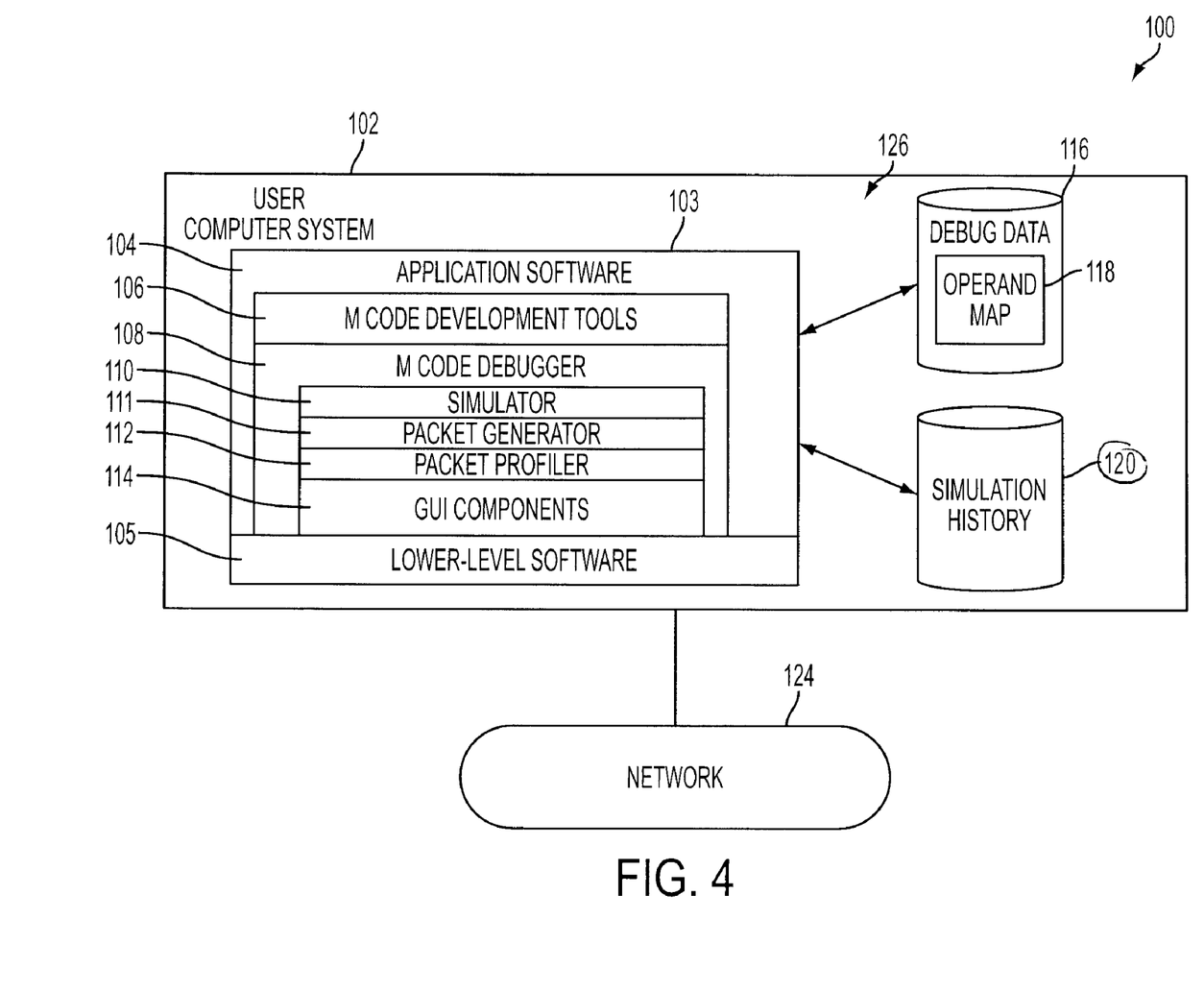
FIG. 4 is an exemplary environment in which a development/debugging system is usable to debug microcode to be executed by ME threads.

FIG. 4 shows an integrated development/debugger system environment 100 that includes a user computer system 102. The user computer system 102 is configured to debug a network processor application developed for use by a target network processor. The network processor application includes microcode intended to execute on a multi-threaded multi-processing network processor. The processor 12 (from FIGS. 1-2) is an example of such a network processor. The user computer system 102 includes software 103, which includes both upper-level application software 104 and lower-level software (such as an operating system or "OS") 105. The application software 104 includes microcode build tools 106 (in the example of processor 12, a compiler and/or assembler, and a linker, which takes the compiler or assembler output on a per-ME basis and generates an image file for all specified MEs).

The application software 104 further includes a source level microcode debugger 108, which includes a simulator 110 to simulate the hardware features of the target processor 12 and possibly external hardware, such as the memory system 18 and network devices 14, 16 (shown in FIG. 1), with which the processor communicates. When the user computer system 102 is operating in a simulation mode, the simulator 110 demonstrates the functional behavior and performance characteristics of a design based on the target processor without relying on the actual hardware. The debugger 108 also includes a packet generator 111, a packet profiler 112 and various GUI components 114. Other application software may be installed on the computer system 102 as well.

Still referring to FIG. 4, the system 102 also includes several databases. The databases include debug data 116, which is "static" (as it is produced by the compiler/linker or assembler/linker at build time) and includes an operand map 118. The databases further include a simulation history 120. The simulation history 120 captures historical information that is generated over time during simulation. The system 102 may be operated in standalone mode or may be coupled to a network 124 (as shown). Collectively, the application software 104 and databases 116, 120 are referred to as the development/debugger tool (indicated by reference numeral 126).

When debugging a network processor application (such as that depicted in the model of FIGS. 3A-3B), the debugger user tends to look for answers to several key questions, such as: "What processing tasks were performed on a packet, and what portion of the code represents those tasks?"; "What caused a packet-forwarding error?"; and "How much processing time was consumed by each task?". Existing network processor application debugging tools utilize an ME- and thread-oriented view of packet processing without features to take into account the application domain. To obtain a clear picture of packet activity using such tools, much manual tracing, e.g., examining thread histories and piecing together fragments of information, is needed. In contrast, the debugger of development/debugger tool 126 is geared towards a more application friendly, "packet-centric" approach to network processor application debugging. It provides the user with an intuitive view of application and packet, activity, while hiding much of the details of the underlying hardware implementation. Through the debugger GUI 114, the user gains a top-level view of a packet path (that is, the path a packet follows through the various functional units of the processor during reception, processing and transmission, if applicable) and is able to "drill down" for more specific details as desired. The tool 126 thus provides support for a packet-centric analysis based on protocol packet generation/validation, packet tracking (or tracing) and graphical views of packet status, events and dataflow, as will be described in further detail below.

Figure 5:
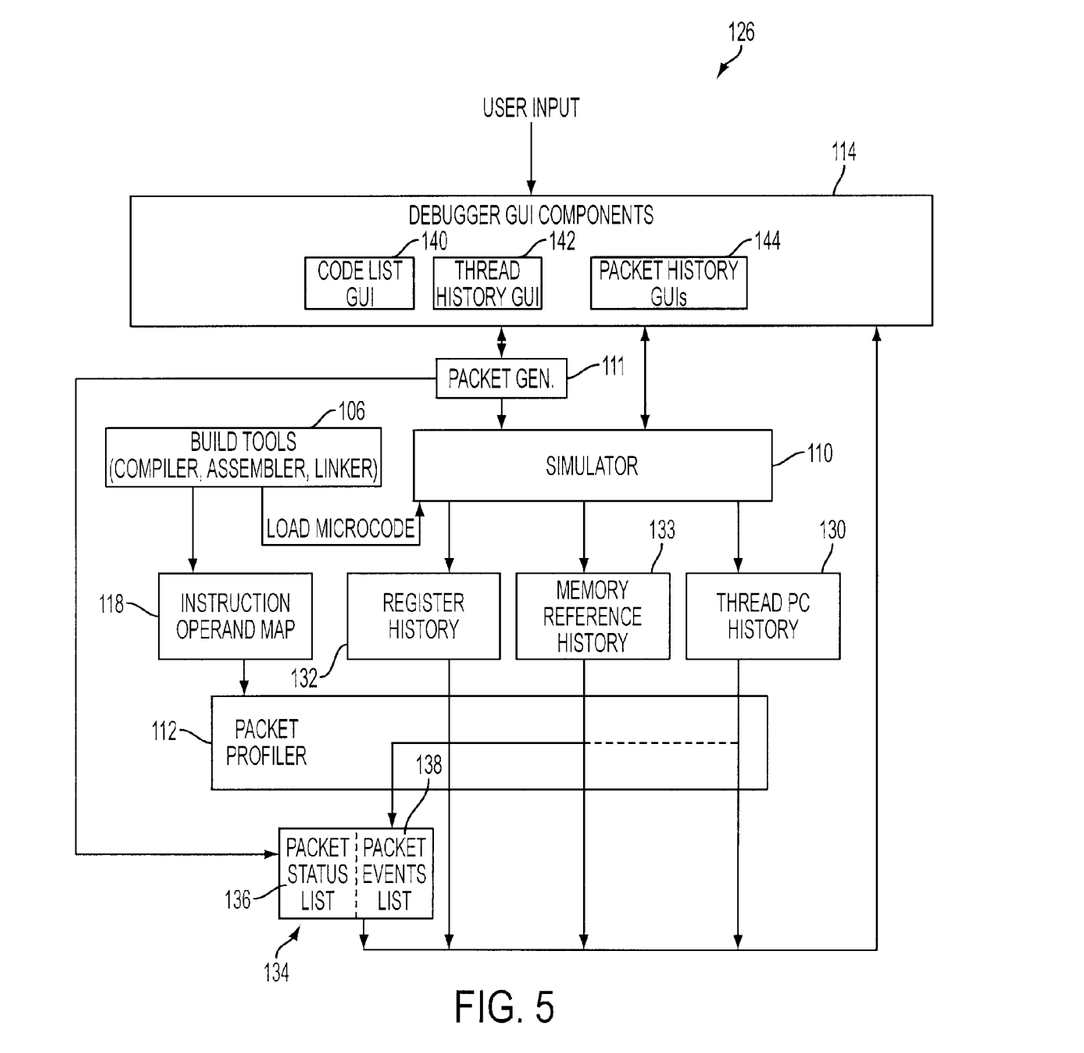
FIG. 5 is a block diagram illustrating various components of the development/debugger system (from FIG. 4) according to an exemplary embodiment.

FIG. 5 shows a more detailed view of the various components of the development/debugger tool 126, in particular those components that are used to perform packet-centric debugging in a multi-threaded multi-microengine simulation environment. The components include the build tools 106, such as compiler and/or assembler, as well as linker; the simulator 110; the packet generator 111; packet profiler 112; debugger GUI 114; operand map 118; and components that make up the simulation history, including a thread (context)/PC history 130, a register history 132; a memory reference history 133; and a packet history 134. The histories 130, 132 and 133, as well as the operand map 118, exist for every ME 20 in the processor 12. The packet history 134 stores a list of packet status 136 and a list of packet events 138. The information of the packet history 134 is produced by the packet generator 111, simulator 110 and packet profiler 112, as will be described later.

The assembler and/or compiler produces the operand map 118 and, along with a linker, provides the microcode instructions to the simulator 110 for simulation. During simulation, the simulator 110 provides event notifications in the form of callbacks to the histories 130, 132, 133. In response to the callbacks, that is, for each time event, the simulator 110 can be queried for ME state information updates to be added to the simulation history 120. The ME state information includes register and memory values, as well as PC values. Other information may be included as well.

The GUI components 114 include a code list GUI 140 and a thread history GUI 142. Both of these GUIs use the simulation histories 130, 132, 133 and the code list GUI 140 uses the operand map 118. The GUI components 114 further include packet history GUIs 144, which use information from the packet history 134, as well as information from the other simulation histories and operand map 118.

Figure 6:
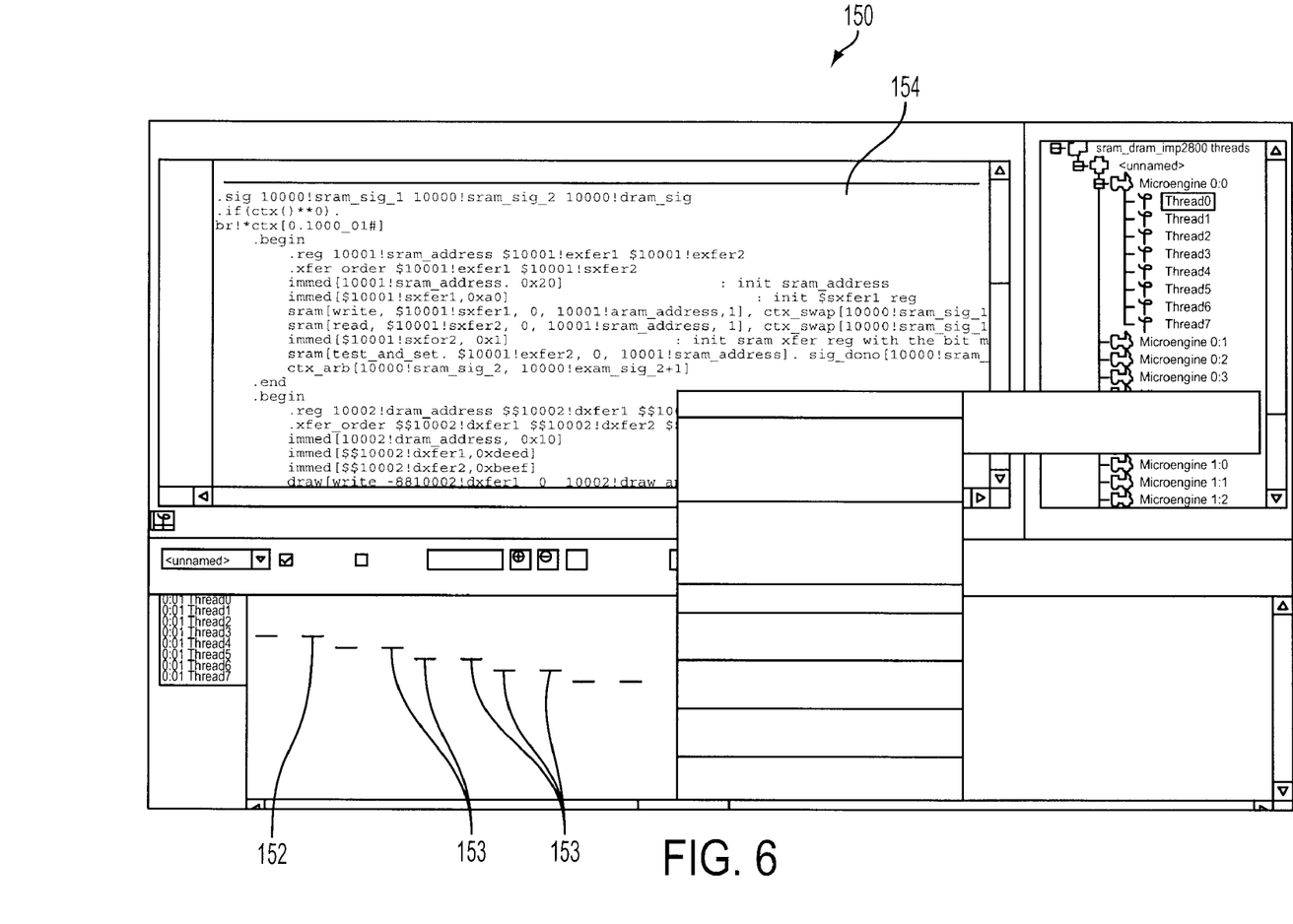
FIG. 6 is a depiction of an exemplary GUI code list view and GUI thread history view.

Referring to FIG. 6, an exemplary screen shot 150 shows various views including a thread history view 152 (of the thread history GUI 142) and a thread window (or code list view) 154 (of the code list GUI 140). While running a software application on the simulator 110, a history of register and memory values is saved in the simulation history 120. Using these values, the GUI components 140 and 142 present a thread history view in which the user can scroll backward and forward in the simulation history by a sliding cycle time window. The thread history view 152 thus provides a horizontally scrollable history of ME threads execution, represented by bars ("thread lines") 153. The thread window 154 is a vertically scrollable list of instructions for a thread. The user can stop at any given cycle time of the simulation in the thread history view 152, and then switch over to the thread window 154. In the latter view, the code line that executed at the given cycle time may be marked to indicate that it is the 'instruction of interest'.

Figure 7:
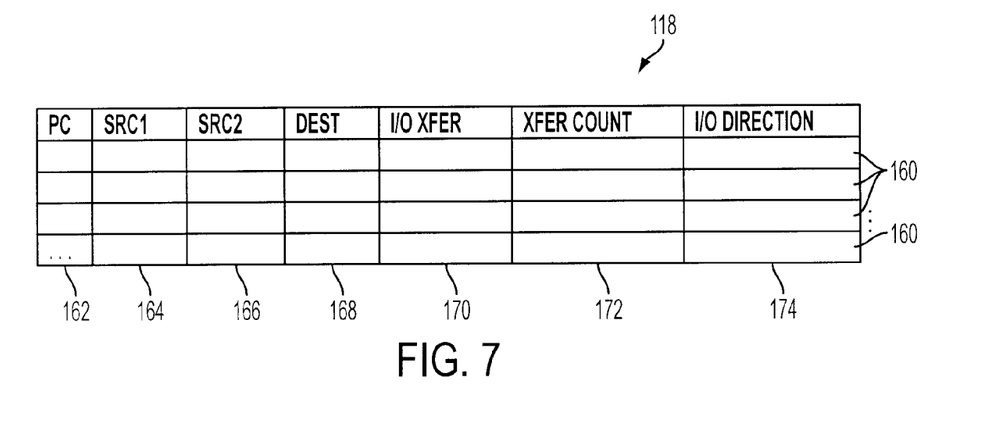
FIG. 7 is a depiction of an exemplary data structure layout of a per-ME Instruction Operand Map.

Referring to FIG. 7, an exemplary layout of the operand map 118 is shown. The operand map 118 is a table placed in the debug data by the linker. For simplicity, only a single table is shown. It will be appreciated that, although only a single table is shown, the operand map would actually include such a table (with the same format) for each ME in the processor 12. The table includes a row 160 for each instruction in the ME microcode and lists in column fields the following: PC 162; source operands including source operand SRC1 164 and source operand SRC2 166; destination operand 168: I/O transfer registers 170; I/O transfer ("Xfer") register count 172; and I/O direction (e.g., read, write, or write/read) 174. Thus, the map can be used to do an operands lookup for a given PC.

Figure 8:
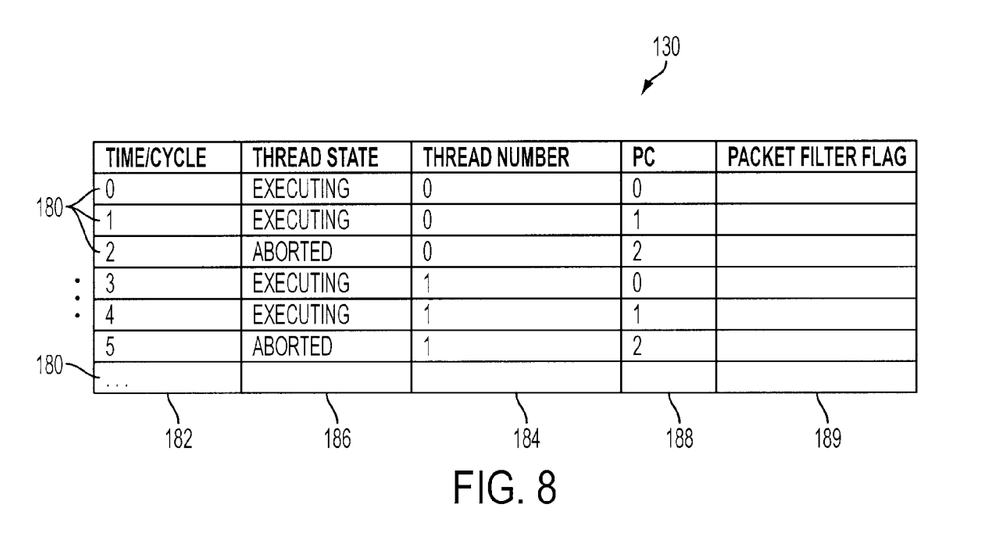
FIG. 8 is a depiction of an exemplary layout of a per-ME program count (PC) history (of the simulation history shown in FIGS. 4 and 5).

Referring to FIG. 8, an exemplary layout of the PC history 130 is shown. The PC history 130 is a table of entries 180 corresponding to threads listed for a predetermined number of time/cycles 182. Again, although there would be table for each ME, only a single table is shown. For each time/cycle 182, the PC history 130 stores a thread (context) identified by thread number 184 and associated thread state 186. The PC history also stores a PC value 188 of the PC for that time/cycle. In one embodiment, events that occurred earlier than a user-specified history threshold are removed from the start of the list. The PC history 130 can be used to determine, for a given time/cycle, the thread number that was executing, if any, and the instruction that the thread executed and the PC value. The time/cycle 182 increases (without gaps) from earliest history cycle to most recent cycle. The thread state 186 is one of the following: executing, aborted, stalled, idle and disabled. The thread number 184 is any value from 0 through the maximum number of threads per ME. The PC value 188 is any value from 0 through the maximum number of instructions per ME.

The PC history 180 also includes a packet filter field 189 to store a flag in association with a PC value 188. Such flags are set by the packet profiler 112 during packet tracing, as will be discussed in further detail later. The flags may be initialized to a "non-relevant" value and changed to a "relevant" value during packet tracing to indicate a particular instruction's relevance to the packet being traced in simulation history.

Figure 9:
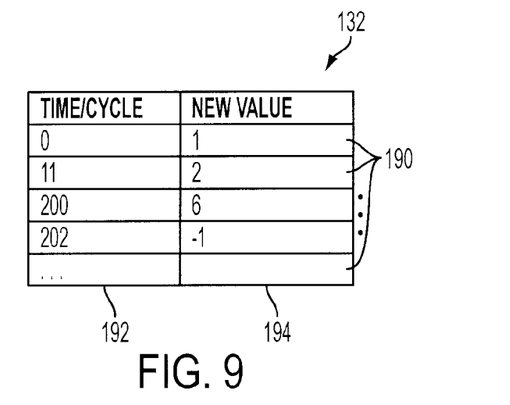
FIG. 9 is a depiction of an exemplary layout of a per-ME, per-register register history (of the simulation history shown in FIGS. 4 and 5).

Referring to FIG. 9, an exemplary layout of the register history 132 is shown. The register history may be a simple table as shown. In the illustrated embodiment, there is register history table for each register in an ME, and a set of such register history tables for each ME. The register history 132 records change events for each register in a ME as a list of time/value pairs 190, each including a time/cycle 192 and corresponding new value 194 (of the register). The list grows over time as register change callbacks from the processor simulator are received. In one embodiment, events that occurred earlier than a user-specified history threshold are removed from the start of the list. Given a time/cycle, it is therefore possible to lookup the value of the register at that time.

In the illustrated embodiment, and again referring back to FIG. 2, history may be collected for the following ME registers: the GPRs 56; the NN Registers 74; the SRAM and DRAM Read Xfer Registers 64; the SRAM and DRAM Write Xfer Registers 62; and Local Memory 66. In addition, history may be collected for various local CSRs.

Figure 10:
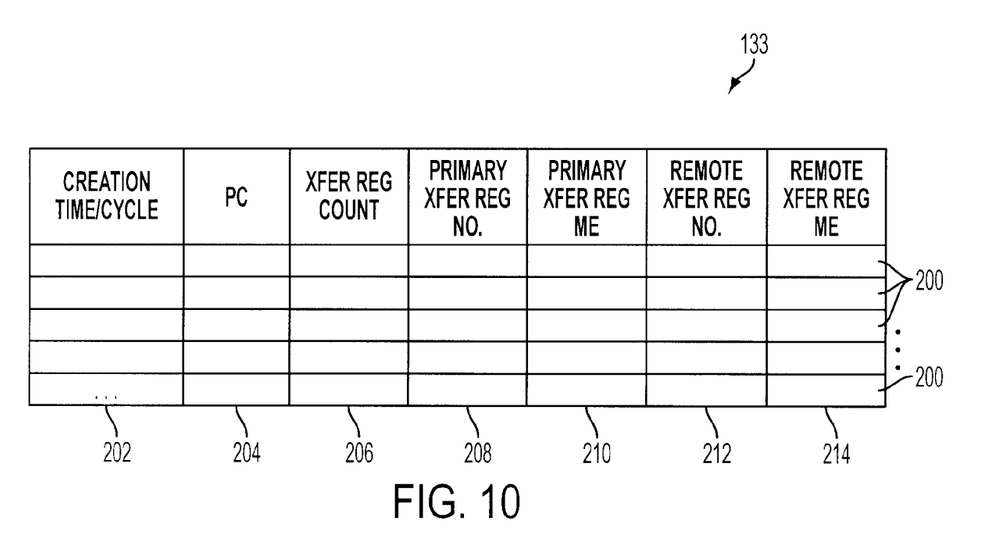
FIG. 10 is a depiction of an exemplary layout of a per-ME memory reference history (of the simulation history shown in FIGS. 4 and 5).

Turning now to FIG. 10, an exemplary layout of the memory reference history 133 is shown. The memory reference history 133 may also be implemented as a simple table, as shown. Again, although only one table is shown, there would be a table for each ME. The memory reference history 133 records I/O reference events for each thread in a ME as a list ordered by creation time. The list grows over time as I/O instructions execute and callbacks from the simulator are received. Events that occurred earlier than a user-specified history threshold are removed from the start of the list. The history 133 contains a list of events 200, which are described by, among other items: Creation Time/Cycle 202; PC (of the I/O instruction) 204; number of longwords bursted in reference, i.e., the Xfer register count 206; Primary Xfer register number 208; Primary Xfer register ME 210; Remote Xfer register number 212 (meaningful for reflector instructions); and Remote Xfer register ME 214 (also meaningful for reflector instructions). Given values of the Time/Cycle 202 and PC 204, it is possible to look up the actual transfer registers used and their count for any I/O instruction.

Referring back to FIGS. 4-5, the packet generator 111 operates to source and validate packets according to user-defined specifications. The specifications may include, for example, specifications that define protocol types and traffic specifications. Packet generation enables the simulator 110 to simulate the network processor operating under a wide range of possible real-world network conditions. The packet generator 111 provides the generated packets to the simulator 110 for simulated network traffic into and out of the network processor, enabling detailed visualization of packet flow, processes, and events as the application runs. The packet generator 111 also provides output verification, including such tasks as payload validation, checksum and CRC checking, protocol conformance, packet sequencing, data rate verification and statistics.

In the illustrated embodiment, the packet profiler 112 is used to generate packet events. Packet events may be generated automatically. The automatic generation may occur in real-time and when the simulation execution has stopped (because it has been completed or paused by the user), e.g., by tracing a packet operated on by an instruction through the various memory and thread associations captured in the simulation histories 130, 132, 133. Other packet events may be generated manually with user assistance ("user-defined packet events").

Packet events can include events related to packets being received, transmitted and processed, as well as memory events. The packet events can also correspond to dropped packets and creation of "derived" packets (e.g., for multicast), and may be used to mark that a packet processing stage has been entered. Other types of packet events, such as the queuing of a packet for non-ME processing, e.g., by the GPP 24 or a host processor, are possible as well.

In one implementation, for the case of user-defined packet events, the packet profiler 112 may be configured to perform packet tracking functions to generate/record packet events. The packet profiler 112 receives callbacks from the simulator 110. When the packet profiler 112 receives a callback from the simulator 110, it performs the packet tracking function specified by the callback. The packet tracking function may be implemented using conditional breakpointing in which a user-specified function is associated with a breakpoint, as described in co-pending U.S. patent application Ser. No. 10/877,457. For example, a user may wish to insert conditional breakpoints into the application code at key packet processing points, and associate events with these key packet processing points.

The packet tracking function may take as arguments parameters such as processor chip name, the ME number, the context number and PC, to uniquely identify a specific ME instruction. The cycle count associated with the event is the current simulation cycle count at the time the function is called. For example, a packet tracking function 'PacketTrack_Create' may be defined to create a new derived packet and return a packet handle that specifies the packet ID associated with the new packet.

Figure 11:
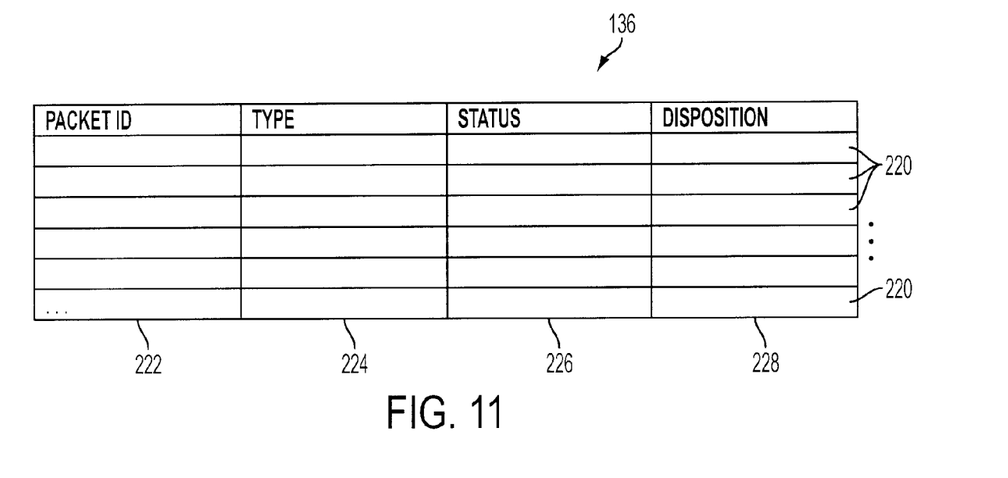
FIG. 11 is a depiction of an exemplary layout of a packet status list of a packet history shown in FIG. 5).
Figure 12:
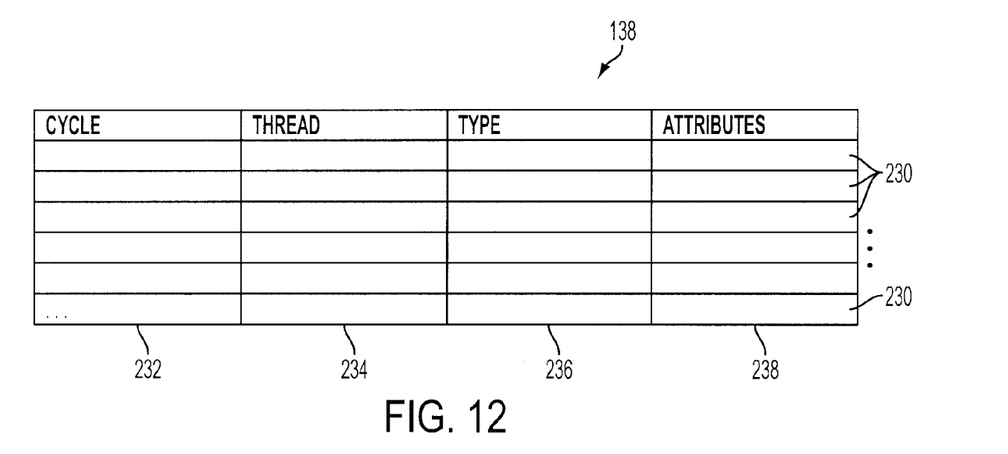
FIG. 12 is a depiction of an exemplary layout of a packet event list (of the packet history shown in FIG. 5).

In the simulation environment of the development/debugger tool 126, certain packet events are captured and saved in the packet event list 136, and packet major status changes are placed in the packet status list 138. FIGS. 11 and 12 show example layouts for the packet status list 136 and the packet event list 138 (from FIG. 5). The packet status list 136 includes an entry 220 corresponding to each status record. Each entry includes following information: packet identifier (ID) 222; type 224; status 226 and disposition 228. The packet event list 138 includes an entry 230 for each packet event in the list. Each entry includes the following information: cycle 232; thread 234; type 236 and attributes 238. The attributes provide a description of the event, as well as other information, such as packet ID. Other information may be stored in these lists as well.

When a packet is generated by the packet generator 111, the status 226 in the packet status list 136 is set to 'generated'. When packet data enters the receive block of the media interface (in the simulator's processor model), a 'Receiving' event is captured and added to the attributes 238 of the packet event list 138, and the packet status 226 of the packet status list 136 is set to 'receiving'. Interim records of segments of packets are held until the end of the packet is received, at which point a 'Received' event is stored in the packet event list 138 and the packet status 226 is updated to 'received'.

Similarly, when a packet is transmitted, the transfer of the data to the transmit block of the media interface (as modeled by the simulator) is detected. In response, a 'Transmitting' event is generated and added to the packet event list 138, and the packet status 226 for that packet in the packet status list 136 is changed to 'Transmitting'. Interim records of segments of packets are held until the end of the packet is received, at which point a 'Transmitted' event is generated and added to the packet event list 138 and the packet status 226 is updated to 'Transmitted'. Following transmit, when the packet generator 111 validates the packet, it sets the packet status 226 in the packet status list 136 to 'Validated'. In the illustrated embodiment, such receive and transmit related events are generated automatically, but they could be generated manually using packing tracking functions instead.

Some or all of the packet events that occur between receive and transmit may be generated manually, and stored in the packet event list. When packet data moves to any memories of the external memory system, an 'AssociateMemory' event may be generated and added to the packet event list 138. When packet data is moved out of such memories, a 'DissociateMemory' event may be generated and added to the packet event list 138. When packet data moves into and is processed by an ME, a 'ProcessingStarted' event may be generated and added to the packet event list 138. When packet processing by a particular thread commences, an 'AssociateThreadWithPacket' event may be generated and added to the packet event list 138 as well. If code running on a thread in the simulation generates a packet, referred to as a "derived packet", a 'PacketDerived' event may be generated and added to the packet event list 138. If code running on a thread simulation drops a packet, a 'PacketDropped' event may be generated and added to the packet event list 138.

In one implementation, the receive/transmit related packet events may be performed in real-time while the simulation is executing whereas all or some packet events occurring in between receive and transmit, e.g., 'AssociateMemory', may be generated while the simulation is stopped or paused. The packet profiler may perform a tracing algorithm to generate these "in between" packet events. The tracing algorithm is invoked by the user, either through a console packet tracking function, or through one of the packet history GUIs.

The tracing algorithm may trace the path of packet data backwards (or forwards) in the simulation history from a particular instruction of interest by following instruction dependencies in the PC History, marking the relevant PC values along the way by setting the flag in the Packet Filter Flag field 189. The packet profiler can then generate appropriate packet events for the packet using the simulation history information (collected in the simulation history 120) for the marked PC values. More specifically, the tracing algorithm may use a PC value to look up instruction attributes (such as type of instruction, register name, register address, and so forth) in the operand map. Based on type of instruction and the information collected in the simulation histories, the tracing algorithm can traverse forward or backward through the PC history to produce packet events for a selected packet. These events can be captured and displayed to the user in the packet history GUIs 144 "on demand". In addition, the packet events could be added to the packet events list 138 in the packet history 134.

It will be appreciated that the type of packet events and the manner in which they are generated and handled are matters of design choice. For example, for simulator performance reasons, it may be desirable to generate certain packet events in real time during simulation and others while the simulator is paused, as was described above.

Figure 13:
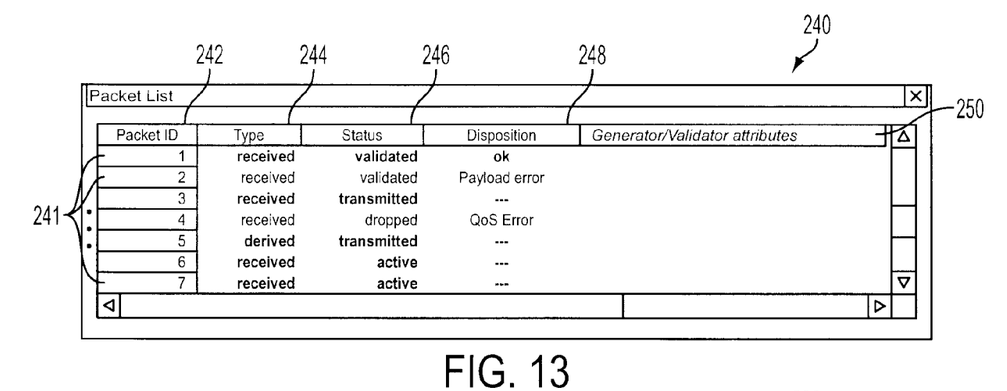
FIG. 13 is a depiction of an exemplary GUI packet list view.
Figure 14:
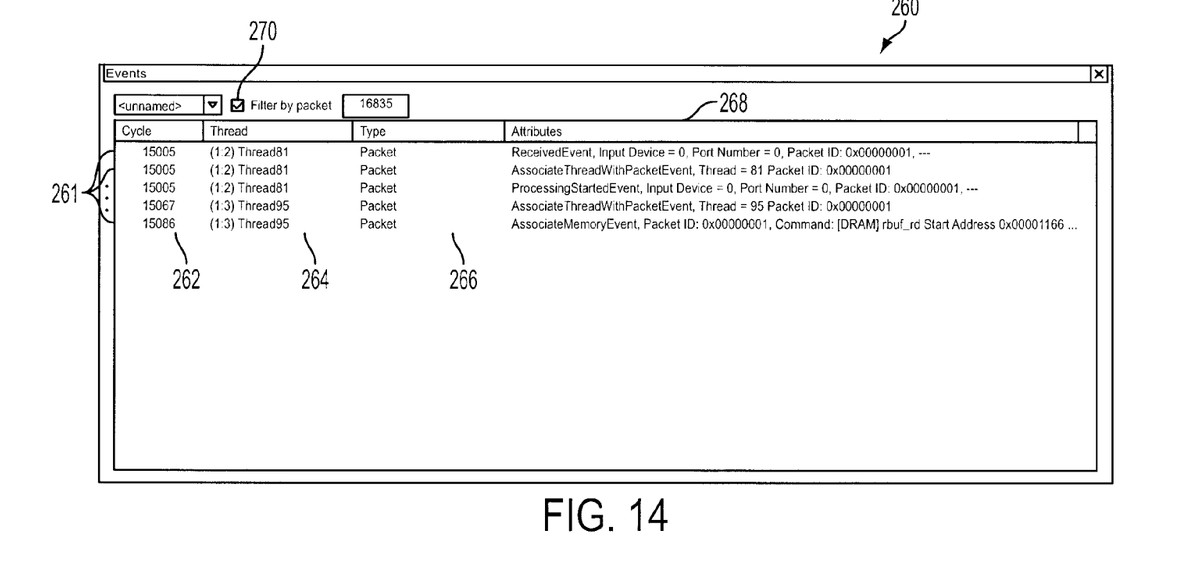
FIG. 14 is a depiction of an exemplary GUI packet event view.

Referring to FIGS. 13-14, two exemplary packet-centric GUI views, that is, views that enable viewing of simulation history in terms of packets for a packet-focused debugging in the system 102, are shown. As shown in FIG. 13, a packet list view 240 (presented by the packet history GUIs 144, from FIG. 5) provides a vertically scrollable view of the packet status list 136. The packet list view 240 includes lines 241, each having fields 242, 244, 246, and 248 corresponding to the packet status list fields packet ID 222, type 224, status 226 and disposition 228, respectively. Other information, such as packet generator attributes (shown as column 250), may be included in this view as well. The disposition of packets is tied to the output verification provided by the packet generator, enabling the user to click on any packet to determine where an error occurred, at what point a threshold was exceeded, or otherwise pinpoint problems on a packet-by-packet basis.

The packet list view 240 may be uses as a starting point for the packet-centric debugging. It shows the state of a packet, such as whether it has been received into the processor chip, transmitted, derived from another packet, or dropped. If the packet was dropped, the reason is displayed in the disposition field 248. If the validation performed by the packet generator 111 caught an error, such as an invalid header format, the symptom information is displayed in the disposition field 248 as well. When the user sees a problem in one of the lines 241 of the packet list view 240, the user can highlight that line to flag the packet represented by that line as a "packet of interest." At that point, the user can right-click on the packet of interest to go to the code list view of the code associated with the last major event, for example, in the case of a 'received' event, the first code to work on that packet, or in the case of a 'transmitted' event, the last code to work on the packet. The packet list view 240 thus allows the user to view all received and derived packets that are known to the simulator.

As shown in FIG. 14, a packet event view 260 (also presented by the packet history GUIs 144) provides a vertically scrollable view of the packet event list 138. In the illustrated embodiment, the packet event view 260 includes lines 261, each including fields 262, 264, 266 and 268 corresponding to the packet events list fields cycle 232, thread 234, type 236 and attributes 238, respectively. The attributes displayed in column 268 provide event details, such as type of event (e.g., 'AssociateMemory'), packet ID and some additional information. The additional information that is provided depends on the nature of the event. In the case of an 'AssociateMemory' event, the additional information may describe the functional unit or shared resource involved in the event. In the case of an 'AssociateThreadWithPacket' event, the additional attributes information would include the number of thread. The I/O device and port numbers may be provided for other types of events, such as 'Received', 'Transmitted' and 'ProcessingStarted' events.

A packet may actually be in the processor for thousands of cycles. Having two major events such as 'Transmitted' and 'Received' several thousand cycles apart reduces the amount of tracing somewhat, but there is still much tracing to do in order to develop a complete picture of packet activity during simulation. The list displayed in the packet event view 260 may be a very large list of all history events, including memory reads/write, processing started on a piece of code by a thread, processing started on a microblock, packets received and transmitted, and other events. The packet event list that is displayed in this view can be filtered, e.g., by packet ID, as is shown in the figure (indicated by a selected 'Filter by packet' checkbox 270). It will be appreciated that other filters, e.g., memory type, microengine, and so forth, could be used. By selecting the 'Filter by packet' option via checkbox 270, the number of events is trimmed to show only those events involving a "packet of interest." The user can then right-click on lines in this view to go to the exact places in the code associated with these events. This capability allows the user to verify major checkpoints along the packet's life as it is being processed by the application. If a highlighted event is associated with an ME context, then the corresponding thread window (thread window 154, shown in FIG. 6) for the context is activated automatically. Thus, a user can review the entire event history for each packet to determine where code originated, or apply packet filters to view events that occurred only when a specific packet was being processed.

Referring back to FIG. 6, as mentioned earlier, the thread history view 152 is useful for watching the behavior of threads. That window provides horizontal thread lines 153, one per thread, for up to "nxN" threads. The user can use that window to scan backward and forward in time and observe memory access events from request to completion. The user can place labels in code to signify important code points and select them for display on the thread line of the thread history window. In addition, for a selected packet of interest, the thread lines 153 presented in the thread history window may be filtered to include only those thread lines that relate to the selected packet.

Figure 15:
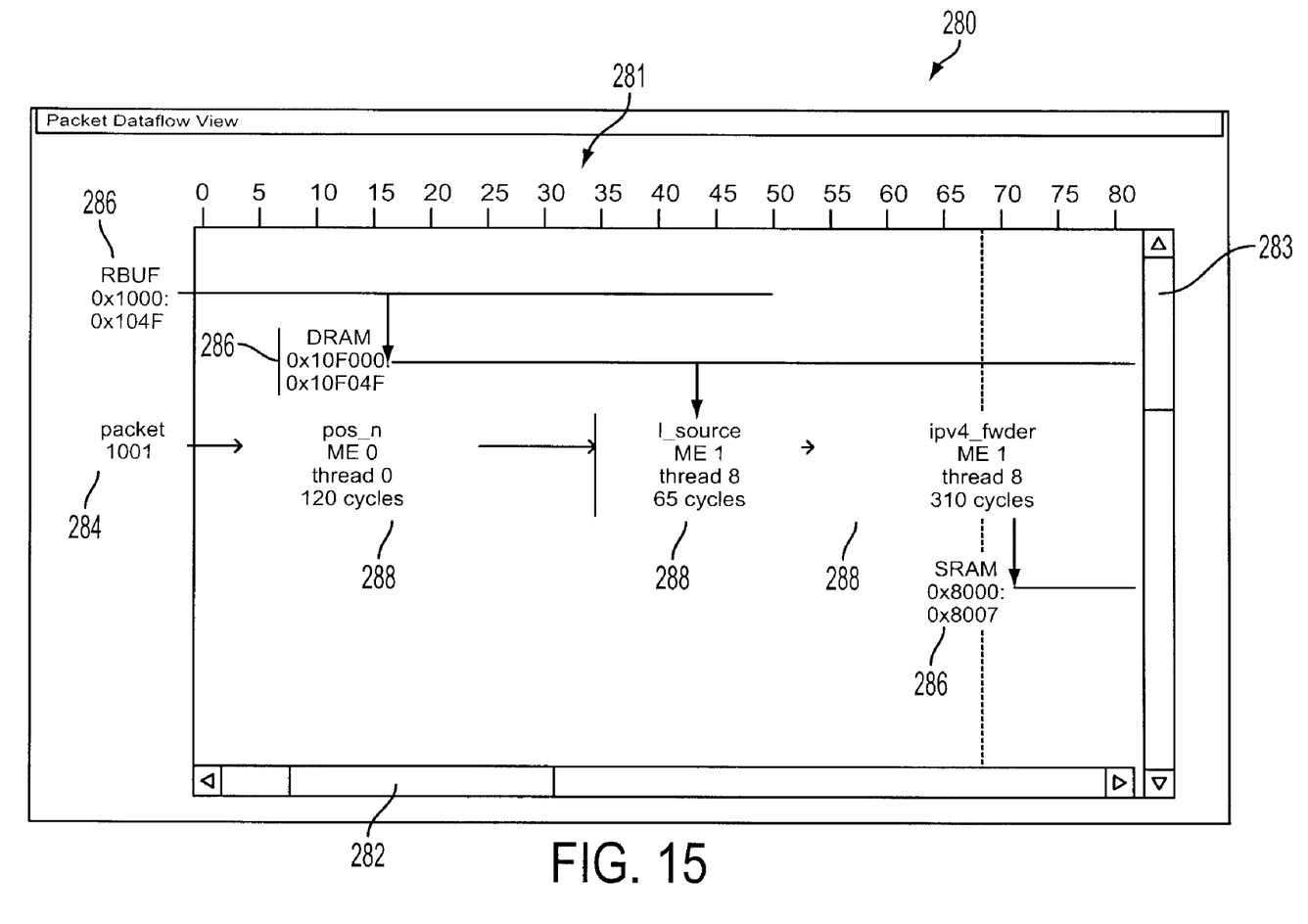
FIG. 15 is a depiction of an exemplary GUI packet dataflow view.

Referring now to FIG. 15, the packet history GUIs 144 extend the history window concept from threads to packets by displaying packets instead of threads over simulation time in the form of a packet-centric, packet dataflow view 280. In the window of the packet dataflow view, packets are displayed horizontally along a timeline 281. The contents of the window are horizontally scrollable using a horizontal scroll bar 282 and are scrollable in a vertical direction using vertical scroll bar 283. A packet identifier label 284 is included at the beginning of the timeline to identify the packet being displayed in the view. Data structure labels 286 identifying resources, such as receive/transmit blocks (of the media interface) and memory devices (e.g., SRAMs, DRAMs, CSRs), visited by packet data of the packet are shown. The data structure labels 284 include addresses and data values of memory references, as appropriate. Also displayed are task labels 288 identifying microblock partitioning to show the flow of code for the packet. In addition to microblock partitioning, each task label 288 may include the number of the ME and thread, as well as number of cycles, involved in the processing of the packet for the displayed microblock, as shown.

The interaction of more than one packet can also be shown. The display of multiple packets may be useful in analyzing access to the shared data in critical sections. Using the packet dataflow view 280, the user can see "at a glance" the actual design running (as envisioned at the earlier stages of architecture planning and code development), with tasks and data structures prominently featured. Erroneous data in data structures, such as bad packet data, incorrect table entry, or wrong inter-thread communication are shown, thus eliminating many steps that would otherwise be required to locate and lookup data values.

All of the GUI views, thread-and packet-based alike, are cross-linked. Thus, when the window of one view scrolls, the windows of the other views scroll and center as well. If a certain packet ID is highlighted in the packet list view and the filter by packet is checked in the packet event view, the packet event view displays only those events that are associated with the packet ID highlighted in the packet list view.

Examples of debug procedures the user can exercise using these GUI views include the following. If the user starts at the packet list view, the user can highlight a line to select a packet, and then right-click to go to code associated with the status change indicated in the status field in that line or, alternatively, go to packet events view and filter by that packet. If the user is in the packet event view, the user can highlight a line to select an event, and then right-click to go to code associated with that event in the code list view or, alternatively, go to the packet data flow view to show code block and data centered (as indicated by a vertical dashed line, as shown in FIG. 15) on that event. In yet another debugging approach, the user can select a packet of interest in either the packet list or event view, and then go to the packet dataflow, where the user can scroll through the code block flow and data structures for that packet using the horizontal scroll bar.

Thus, with the development/debugger tool 126, debugging network processor application software is an efficient process, as the user can go from packet status or event to code in just a few steps. Also, users unfamiliar with the design of the application software can follow a packet dataflow view that shows the flow of code and the data operated on by a packet.

Figure 16:
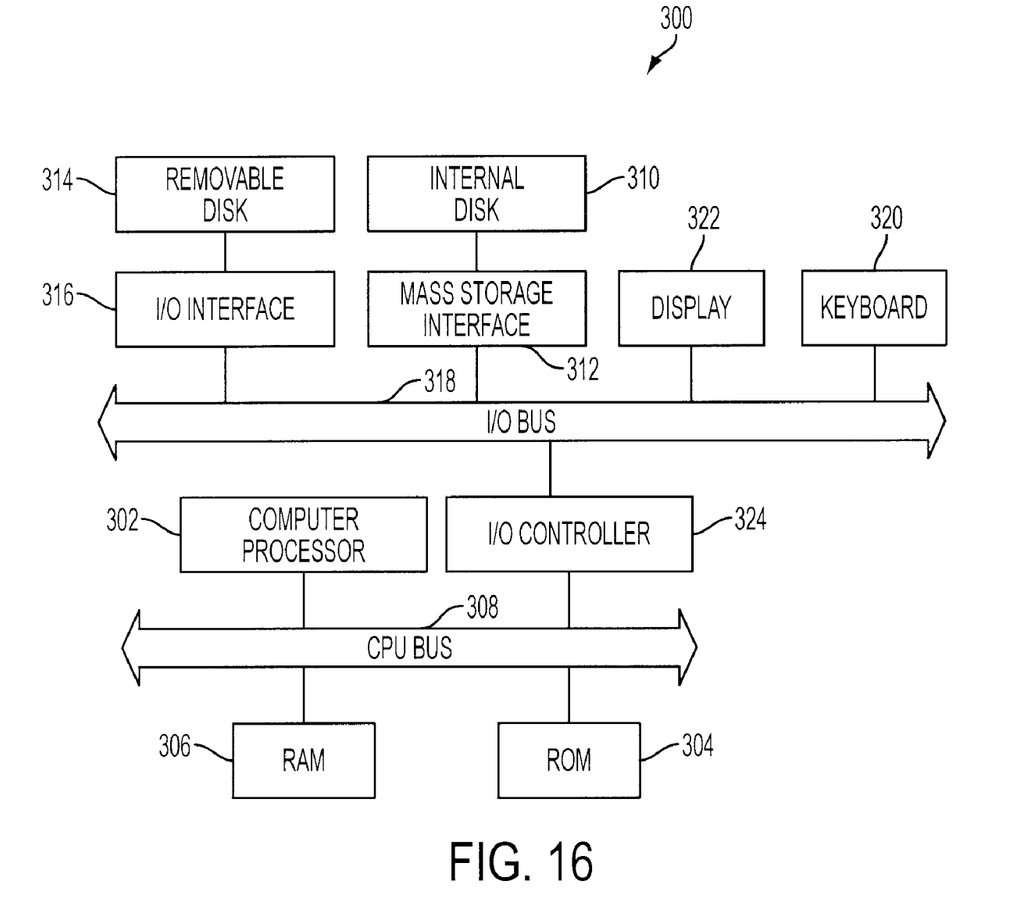
FIG. 16 is a diagram illustrating a sample computer system suitable to be programmed with embodiments of the development/debugger system of FIGS. 4-5.

Referring to FIG. 16, an exemplary computer system 300 suitable for use as system 102 as a development/debugger system and, therefore, for supporting the upper-level application software 104 of the development/debugger tool 126, including the debugger software, and any other processes used or invoked by such software), is shown. The upper-level application software may be implemented in a computer program product tangibly embodied in a machine-readable storage device for execution by a computer processor 302; and methods of the tool 126 may be performed by the computer processor 302 executing a program to perform functions of the tool 126 by operating on input data and generating output.

Suitable processors include, by way of example, both general and special purpose microprocessors. Generally, the processor 302 will receive instructions and data from a read-only memory (ROM) 304 and/or a random access memory (RAM) 306 through a CPU bus 308. A computer can generally also receive programs and data from a storage medium such as an internal disk 310 operating through a mass storage interface 312 or a removable disk 314 operating through an I/O interface 316. The flow of data over an I/O bus 318 to and from devices 310, 314, (as well as input device 320, and output device 322) and the processor 302 and memory 306, 304 is controlled by an I/O controller 324. User input is obtained through the input device 320, which can be a keyboard (as shown), mouse, stylus, microphone, trackball, touch-sensitive screen, or other input device. These elements will be found in a conventional desktop computer as well as other computers suitable for executing computer programs implementing the methods described here, which may be used in conjunction with output device 322, which can be any display device (as shown), or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 310 and removable disks 314; magneto-optical disks; and CD-ROM disks. Any of the foregoing may be supplemented by, or incorporated in, specially-designed ASICs (application-specific integrated circuits).

Typically, the application software of the tool 126 and other related processes reside on the internal disk 310. These processes are executed by the processor 302 in response to a user request to the computer system's operating system in the lower-level software 105 after being loaded into memory. Any files or records produced by these processes may be retrieved from a mass storage device such as the internal disk 310 or other local memory, such as RAM 306 or ROM 304.

The system 102 illustrates a system configuration in which the application software 104 is installed on a single standalone or networked computer system for local user access. In an alternative configuration, e.g., the software or portions of the software may be installed on a file server to which the system 102 is connected by a network, and the user of the system accesses the software over the network.

Other embodiments are within the scope of the following claims.

What is claimed is:

1. A graphical user interface comprising:
 a debugger interface to enable a user to execute application software during a simulation that models a processor for which the application software was developed, results of the simulation being captured to produce a simulation history; and
 the debugger interface comprises a GUI that is usable to provide one or more cross-linked packet-centric views of the simulation history for packets operated on by the application software during the simulation, said one or more cross-linked packet-centric views including a packet status list GUI, a packet event list GUI, a packet dataflow GUI, a thread list GUI, and a thread history GUI, wherein said packets comprise a header and a payload.

2. The graphical user interface of claim 1 wherein the simulation history comprises packet status, and the one or more packet-centric views comprises a view of the packet status in said packet status list GUI, said packet status list GUI configured to indicate at least one of whether a given packet has been received into said processor, transmitted, derived, and dropped.

3. The graphical user interface of claim 2 wherein the view of the packet status comprises lines corresponding to packets, and each such line is usable to select the packet to which the line corresponds as a packet of interest for further analysis in another of the one or more packet-centric views.

4. The graphical user interface of claim 1 wherein the simulation history comprises packet events, and the one or more packet-centric views comprises a view of the packet events in said packet event list GUI, said packet event list GUI including at least one history event selected from the group comprising memory reads/writes, processing initiated by a thread, processing initiated on a microblock, and packets received and transmitted.

5. The graphical user interface of claim 4 wherein the view of the packet events comprises lines corresponding to packet events occurring for packets during the simulation.

6. The graphical user interface of claim 3 wherein the simulation history further comprises packet events, and the one or more packet-centric views comprises a view of the packet events, the view of the packet events comprising lines corresponding to packet events and a filtering option that, when enabled, allows only those of the lines corresponding to packet events associated with the packet of interest selected in the view of the packet status to be displayed in the view of the packet events.

7. The graphical user interface of claim 1 wherein the one or more packet-centric views comprises a packet dataflow view, said packed dataflow view including at least one of a data structure label including an address and data value of a memory reference, a packet identifier label configured to identify a displayed packet and a task label identifying microblock partitioning.

8. A development/debugger tool comprising:
 software to generate application code for a target processor; a simulator to execute the application code during a simulation that models the target processor;
 a GUI to interface to the simulation history; and
 wherein the GUI is usable to provide one or more cross-linked packet-centric views of the simulation history for packets operated on by the application code during the simulation, said one or more cross-linked packet-centric views including a packet status list GUI, a packet event list GUI, a packet dataflow GUI, a thread list GUI, and a thread history GUI, wherein said packets comprise a header and a payload.

9. The development/debugger tool of claim 8 wherein the one or more packet-centric views comprises a packet list view, a packet event view and a packet dataflow view.

10. The development/debugger tool of claim 9 wherein the GUI is usable to provide to a code list view to view code of the application software that executed during the simulation, and anyone of the packet list view, packet event view and packet dataflow view is usable to bring a user of the GUI to the code list view to view code associated with a packet event of interest.

* * * * *